United States Patent
Agrawal et al.

(10) Patent No.: US 9,567,112 B1
(45) Date of Patent: Feb. 14, 2017

(54) METHOD AND APPARATUS FOR SINGULARITY AVOIDANCE FOR CONTROL MOMENT GYROSCOPE (CMG) SYSTEMS WITHOUT USING NULL MOTION

(71) Applicant: The United States of America, as represented by the Secretary of the Navy, Washington, DC (US)

(72) Inventors: Brij N. Agrawal, Monterey, CA (US); Jae Jun Kim, Seaside, CA (US); Timothy Andrew Sands, Pebble Beach, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 196 days.

(21) Appl. No.: 14/316,639

(22) Filed: Jun. 26, 2014

Related U.S. Application Data (60) Provisional application No. 61/840,010, filed on Jun. 27, 2013.

(51) Int. Cl.
*B64G 1/36* (2006.01)
*B64G 1/28* (2006.01)
*G05D 1/08* (2006.01)

(52) U.S. Cl.
CPC .............. *B64G 1/286* (2013.01); *G05D 1/0883* (2013.01)

(58) Field of Classification Search
CPC ............................... B64G 1/286; G05D 1/0883
USPC .................................. 701/4, 13, 41; 244/165
See application file for complete search history.

(56) References Cited

U.S. PATENT DOCUMENTS

| | | | |
|---|---|---|---|
| 4,911,385 | A | 3/1990 | Agrawal et al. |
| 6,039,290 | A | 3/2000 | Wie et al. |
| 6,047,927 | A | 4/2000 | Heiberg et al. |
| 6,128,556 | A | 10/2000 | Bailey |
| 6,131,056 | A | 10/2000 | Bailey et al. |
| 6,154,691 | A | 11/2000 | Bailey |
| 6,917,862 | B2 | 7/2005 | Wie |

(Continued)

OTHER PUBLICATIONS

X. Roser, M. Sghedoni, "Control Moment Gyroscopes (CMG's) and their Application in Future Scientific Missions," Spacecraft Guidance, Navigation and Control Systems, Proceedings of the 3rd ESA International Conference, Nov. 26-29, 1996, pp. 523-528, Noordwijk, the Netherlands.

*Primary Examiner* — Redhwan K Mawari
*Assistant Examiner* — Rodney P King
(74) *Attorney, Agent, or Firm* — Naval Postgraduate School; Lisa A. Norris (57) ABSTRACT

A method is described for avoiding gyroscopic singularities during attitude correction to a system, such as a spacecraft having a CMG array. The method receives a corrective torque vector μ and gimbal angle values δ for each of at least three gimbals within the CMG array. The method generates a Jacobian matrix A as a function of gimbal angle values δ. The method calculates a determinant D of Jacobian matrix A. If the determinant is not equal to zero, it is not singular, and the method calculates a gimbal rate δ̇ using a pseudo-inverse steering law equation. If the determinant is equal to zero, it is singular, and the method calculates a gimbal rate δ̇ using a singularity avoidance steering law equation. The gimbal rate δ̇ is output and can be applied to a CMG array resulting in applied torque to a spacecraft and attitude correction.

15 Claims, 6 Drawing Sheets

(56) References Cited

U.S. PATENT DOCUMENTS

| | | | |
|---|---|---|---|
| 7,246,776 B2 | 7/2007 | Peck et al. | |
| 7,627,404 B2 | 12/2009 | Heiberg | |
| 7,693,619 B2 | 4/2010 | Elgersma et al. | |
| 7,805,226 B2 | 9/2010 | Hamilton et al. | |
| 7,904,214 B2 | 3/2011 | Heiberg | |
| 7,974,746 B2 | 7/2011 | Heiberg | |
| 2004/0111194 A1* | 6/2004 | Wie | G05D 1/0883 701/13 |
| 2005/0125111 A1* | 6/2005 | Bonn | B64G 1/286 701/4 |
| 2006/0027708 A1* | 2/2006 | Peck | G05D 1/0883 244/165 |
| 2010/0152953 A1 | 6/2010 | Hamilton | |

* cited by examiner

METHOD AND APPARATUS FOR SINGULARITY AVOIDANCE FOR CONTROL MOMENT GYROSCOPE (CMG) SYSTEMS WITHOUT USING NULL MOTION

CROSS-REFERENCE TO RELATED PATENT APPLICATIONS

This application is a non-provisional application of and claims priority to U.S. Patent Application 61/840,010, filed on Jun. 27, 2013, which is hereby incorporated by reference in its entirety.

STATEMENT OF GOVERNMENT INTEREST

The invention described herein was made by employees of the United States Government and may be manufactured and used by or for the Government of the United States of America for governmental purposes without the payment of any royalties thereon or therefore.

BACKGROUND OF THE INVENTION

1. Field of the Invention

This invention relates to the field of spacecraft vehicle control and, more specifically, to a method and apparatus for avoiding gyroscope array singularities.

2. Description of the Related Art

Control moment gyroscope (CMG) arrays are used for spacecraft attitude control due to their torque-producing capability. A typical attitude control system includes an array of three or more CMGs. Each CMG within the array includes a rotor spinning about an axis mounted to an actuated gimbal. The rotational motion of the rotor and gimbal creates an angular momentum vector and a torque vector. The torque vector is orthogonal to the angular momentum vector. The rate of rotation of the gimbal controls the torque vector, producing movement in a desired direction when the torque is not zero.

Controlling attitude for a spacecraft requires at least three degrees of freedom. Thus, a typical attitude adjustment system may use an array of at least three CMGs that together output a combined torque. A corrective torque vector can be calculated by comparing the desired attitude of the spacecraft with the actual spacecraft attitude to generate a corrective torque vector $\mu$.

Corrective torque vector $\mu$ may then be used to calculate the gimbal rate $\dot{\delta}$ necessary to correct attitude. This calculation may be expressed as $A\dot{\delta}=\mu$, where A is a Jacobian matrix as a function of the gimbal angle values $\delta$ for the CMGs in the CMG array, $\dot{\delta}$ is a gimbal rate and $\mu$ is the corrective torque vector. Without performing null motion calculations, the gimbal rate $\dot{\delta}$ can be calculated by a pseudo-inverse steering law equation $\dot{\delta}=A^T(AA^T)^{-1}\mu$ where $\dot{\delta}$ is the gimbal rate, A is a Jacobian matrix determined by the gimbal angle values $\delta$ for each of the CMGs in the CMG array, $A^T$ is the Jacobian matrix A transposed, and $\mu$ is the corrective torque vector.

An undesirable condition, known as a singularity or a singular state, occurs when gimbals of a CMG array are respectively oriented so that each of the torque vectors produced by moving the gimbals are parallel to each other. The pseudo-inverse steering law equation is unusable when a CMG array is in a singular state. When a CMG array is in a singular state, the determinant D of Jacobian matrix A is zero. For a CMG array using three CMGs, a Jacobian matrix A has the form $$\begin{bmatrix} L_1 & L_2 & L_3 \\ M_1 & M_2 & M_3 \\ N_1 & N_2 & N_3 \end{bmatrix},$$

where $L_i$ denotes the $i^{th}$ column value of row L, $M_i$ denotes the $i^{th}$ column value of row M and $N_i$ denotes the $i^{th}$ column value of row N. Calculation of determinant D uses the equation $D=L_1(M_2N_3-M_3N_2)-L_2(M_1N_3-M_3N_1)+L_3(M_1N_2-M_2N_1)$.

Various calculations are known in the art for addressing singularities. These methods include singularity-robust inverse techniques, path planning methods, preferred gimbal angle methods and the use of variable speed CMGs (VSC-MGs). However, these methods each exhibit various limitations. For example, the singularity-robust inverse technique of Roser et al. cannot not be used for all angle sets produced by a CMG array. (X. Roser, M. Sghedoni, "Control Moment Gyroscopes (CMG's) and their Application in Future Scientific Missions," Spacecraft Guidance, Navigation and Control Systems, Proceedings of the 3rd ESA International Conference, 26-29 Nov. 1996, pp. 523-528, Noordwijk, the Netherlands.)

U.S. Pat. No. 6,039,290 to Wie et al. teaches a method using non-zero elements in the off-diagonal element of the positive definite diagonal matrix P. However, the choice of matrix P is arbitrary and does not guarantee quick transients of singular states.

U.S. Pat. No. 6,131,056 to Bailey et al. teaches a method of using an open-loop signal when the CMG array becomes singular. This method is computationally expensive and may result in a large control error due to disturbances.

SUMMARY OF THE INVENTION

In accordance with one embodiment, a method for avoiding gyroscopic singularities during attitude correction includes: receiving a corrective torque vector $\mu$; receiving gimbal angle values $\delta$ for each of at least three gimbals within a CMG array; generating a Jacobian matrix A as a function of the gimbal angle values $\delta$; calculating a determinant D of the Jacobian matrix A; determining whether the determinant D is equal to zero; wherein when the determinant D is not equal to zero, calculating a gimbal rate $\dot{\delta}$ using a pseudo-inverse steering law equation; otherwise, wherein when the determinant D is equal to zero, calculating a gimbal rate $\dot{\delta}$ using a singularity avoidance steering law equation; and outputting the gimbal rate $\dot{\delta}$.

In accordance with another embodiment, a computer based apparatus for avoiding gyroscopic singularities during attitude correction includes a processing component configured to perform the above method.

In accordance with another embodiment, a computer program storage component has stored therein program instructions executable by a computer processing component to perform the above method.

BRIEF DESCRIPTION OF THE DRAWINGS

Embodiments in accordance with the invention are further described herein with reference to the drawings.

DETAILED DESCRIPTION OF INVENTION

Figure 1A:
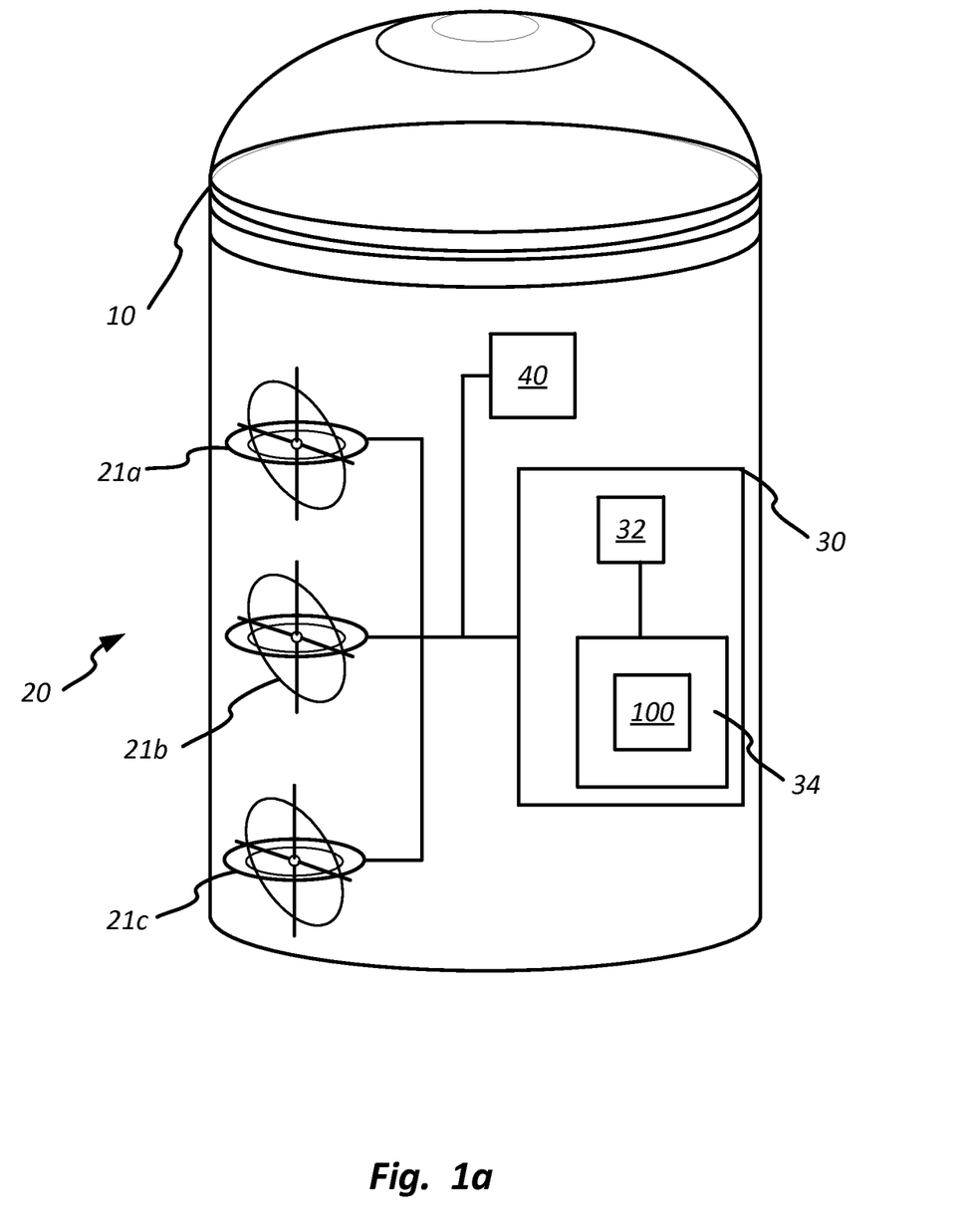
FIG. 1a illustrates a system including a method for avoiding gyroscopic singularities during attitude correction in accordance with one embodiment of the invention.

FIG. 1a illustrates a system including a method 100 for avoiding gyroscopic singularities in accordance with one embodiment of the invention. In FIG. 1a, a spacecraft 10 having a CMG array 20 of three CMGs 21a, 21b and 21c, includes an attitude controller 40, and a computer apparatus 30 including method 100 for avoiding gyroscopic singularities during attitude correction. In various embodiments, CMG array 20 may include additional CMGs.

In one embodiment, computer apparatus 30 including method 100 is located on spacecraft 10. In alternate embodiments computer apparatus 30 and/or method 100 can be at a location remote from spacecraft 10, and the output of method 100 communicated to spacecraft 10. In various embodiments, computer apparatus 30 may be a processing component configured to perform method 100 or a computer program storage component with stored program instructions executable by a computer processing component to perform method 100. A processing component physically configured to perform method 100 may include, but is not limited to a microprocessor, a field-programmable gate array or an application-specific integrated circuit. A computer program storage component may include, but is not limited to non-volatile random-access memory, hard disk drives and optical discs. In some embodiments, attitude controller 40 may be differently located, for example, as part of computer apparatus 30.

In FIG. 1a, computer apparatus 30 includes a central processing unit (CPU) 32 having at least one memory 34 for storing method 100. Computer apparatus 30 can receive inputs to and send outputs from method 100. More particularly, computer apparatus 30 can receive inputs to method 100 from CMG array 20 and attitude controller 40 and can send outputs to CMG array 20 and other systems both on and remote from spacecraft 10. In one embodiment, method 100 is embodied as computer implementable code stored in memory 34. In one embodiment, method 100 is stored as computer implementable code, i.e., program instructions executable by a computer processing component, in a computer program product such as computer readable disk or other computer program storage component, and can be loaded into memory 34 via one or more input interfaces (not shown).

Figure 1B:
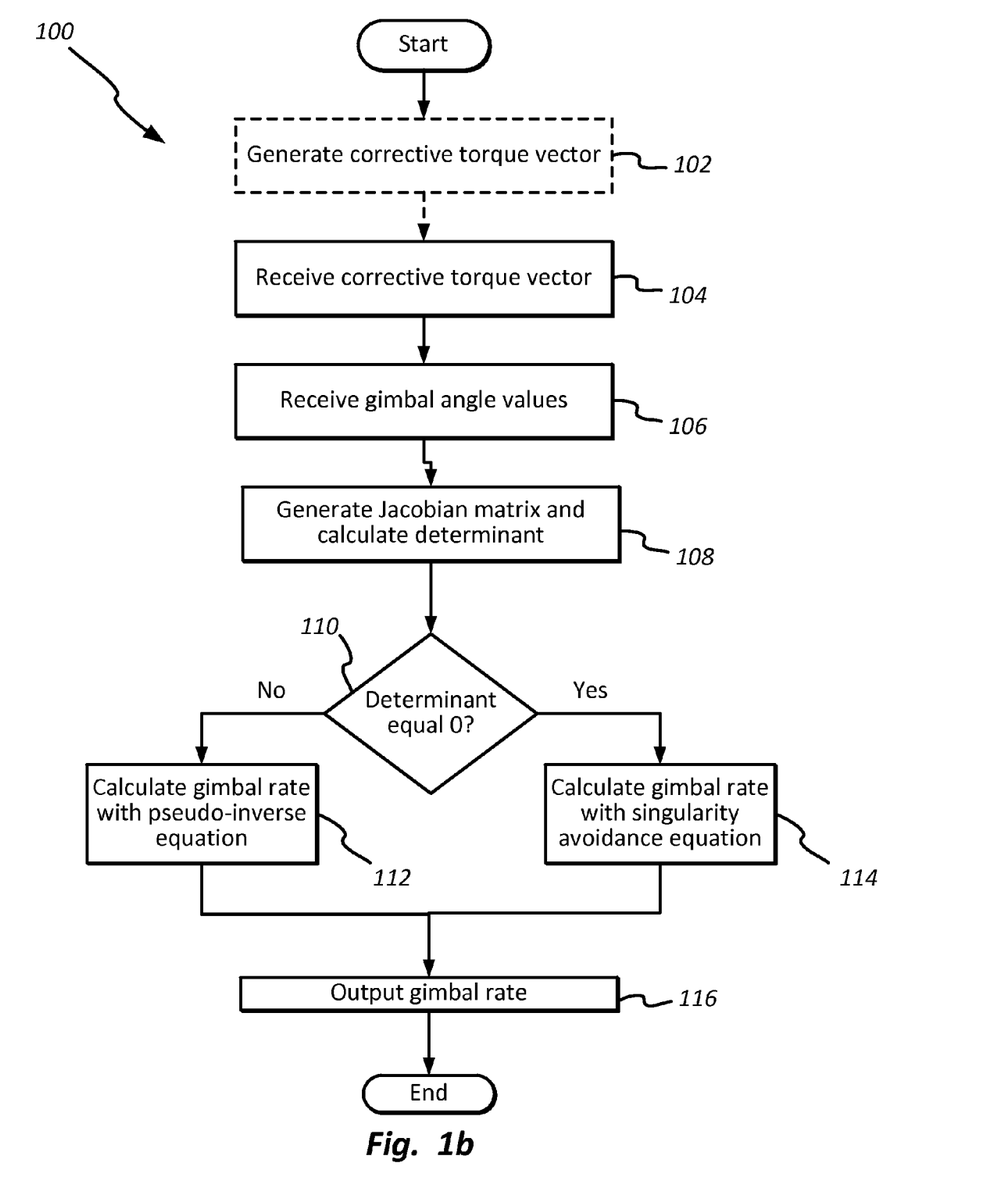
FIG. 1b illustrates a process flow diagram of the method of FIG. 1a in accordance with one embodiment of the invention.

FIG. 1b illustrates a process flow diagram of method 100 for avoiding gyroscopic singularities in accordance with one embodiment of the invention.

Optionally, in operation 102 a corrective torque vector μ is generated after receiving and comparing a desired attitude measurement with an actual attitude measurement and processing transitions from optional operation 102 to operation 104. In one embodiment, the desired attitude measurement may be received at spacecraft 10 from steering system (not shown) or other directional communication. In one embodiment the actual attitude measurement may be received from attitude controller 40 or other attitude measurement communication.

In operation 104, method 100 receives a value for corrective torque vector μ, and processing transitions from operation 104 to operation 106. In one embodiment, method 100 receives corrective torque vector μ from attitude controller 40.

In operation 106, method 100 receives gimbal angle values δ for each of at least three gimbals within CMG array 20 and processing transitions from operation 106 to operation 108. In one embodiment method 100 receives inputs of gimbal angle values δ for each of CMGs 21a, 21b and 21c. In one embodiment the inputs of gimbal angle values δ for each of CMGs 21a, 21b and 21c are received from each of CMGs 21a, 21b and 21c. in one embodiment, the inputs of gimbal angle values δ for each of CMGs 21a, 21b and 21c are received from attitude controller 40. In some embodiments, operation 104 is performed after operation 106.

In operation 108, method 100 generates a Jacobian matrix A as a function of gimbal angle values δ using the gimbal angle values δ for each of CMGs 21a, 21b and 21c and calculates a determinant D of Jacobian matrix A and processing transitions from operation 108 to decision operation 110. Generation of a Jacobian matrix and calculation of a determinant for a Jacobian matrix is well known to those of skill in the art and not further detailed herein.

In decision operation 110, a determination is made whether CMG array 20 is in a singular state based on the value of the determinant D calculated in operation 108. In method 100, the value of determinant D establishes whether CMG array 20 is in a singular state. In one embodiment, when the value of determinant D is determined to be not zero ("NO"), CMG array 20 is not in a singular state, and processing transitions from operation 110 to operation 112. Alternatively, when the value of determinant D is zero ("YES"), CMG array 20 is determined to be in a singular state and processing transitions from operation 110 to operation 114.

Referring now to operation 112, in operation 112, method 100 calculates a gimbal rate $\dot{\delta}$ using a pseudo-inverse steering law equation when CMG array 20 is not in a singular state, and processing transitions from operation 112 to operation 116. In one embodiment, method 100 generates gimbal rate $\dot{\delta}$ based on the pseudo-inverse steering law equation $$\dot{\delta} = A^T(AA^T)^{-1}\mu,$$

in which $\dot{\delta}$ is the gimbal rate, A is the Jacobian matrix determined by the gimbal angle values δ for each of CMGs 21a, 21b and 21c, $A^T$ is the Jacobian matrix A transposed, and μ is the corrective torque vector.

Referring back to operation 114, in operation 114, method 100 calculates gimbal rate $\dot{\delta}$ using a singularity avoidance steering law equation when CMG array 20 is in a singular state and processing transitions from operation 114 to operation 116. In one embodiment, method 100 generates gimbal rate $\dot{\delta}$ based on one of three singularity avoidance steering law equations: a direct modification singularity avoidance steering law equation, a constrained singularity avoidance equation, or a penetration singularity avoidance steering law equation.

Direct Modification Singularity Avoidance Steering Law Equation

The direct modification singularity avoidance steering law equation utilizes a direct modification of singular values. Singular value decomposition of Jacobian matrix A is written as $A=U\Sigma V^H$, where $U^H U=1$, $V^H V=1$, and $$\Sigma = \begin{bmatrix} S & 0 \\ 0 & 0 \end{bmatrix},$$

and $S=\text{diag}(\sigma_1, \ldots, \sigma_r)$, $(\sigma_1 \geq \ldots \geq \sigma_r > 0)$, where $\Sigma$ is the rectangular diagonal matrix from the singular value decomposition with nonnegative real numbers on the diagonal, U is the left unitary matrix from the singular value decomposition, V is the right unitary matrix from the singular value decomposition, S is the square diagonal matrix whose diagonal elements are singular values of Jacobian matrix A, $\sigma_1$ is the largest singular value and $\sigma_r$ is the smallest singular value.

When the rank of Jacobian matrix A is three, the pseudo-inverse of Jacobian matrix A is written as $A^\dagger = U\Sigma^\dagger V^H$, where $$\Sigma^\dagger = \begin{bmatrix} S^{-1} & 0 \\ 0 & 0 \end{bmatrix}$$

and $$\sigma_r = \begin{cases} \sigma_r & (\sigma_r > \eta) \\ \eta & (\sigma_r \leq \eta) \end{cases}$$

This is a standard pseudo-inverse steering law $\dot{\delta}=A^\dagger u$. When the CMG array momentum approaches the singularity, at least one singular value $\sigma$ will approach zero such that $\sigma_r \to 0$. The inverse of this singular value $\sigma$ will be very large, which will eventually result in an unrealizable gimbal rate. The direct modification singularity avoidance steering law equation directly modifies the value of $\sigma_r$ when the CMG array is near the singular configuration such that $$S^{-1} = \text{diag}\left(\frac{1}{\sigma_1}, \ldots, \frac{1}{\sigma_r}\right).$$

where $\eta$ is a user selected small positive number. The resulting inverse solution will guarantee the solution regardless of the condition of Jacobian matrix A.

Constrained Singularity Avoidance Steering Law Equation

The constrained singularity avoidance steering law equation utilizes a constrained singularity-robust inverse. In the constrained singularity avoidance steering law equation, determinant D of Jacobian matrix A becomes zero. When the CMG array approaches singularity, a constraint can be imposed such that determinant D of Jacobian matrix A quickly transients through zero. The time-derivative of determinant D of Jacobian matrix A can be written as $$\frac{d}{dt}[\det(A)] = \frac{\partial}{\partial \delta}[\det(A)]\frac{d\delta}{dt} = C\dot{\delta},$$

where C is a partial derivative of determinant D of Jacobian matrix A with respect to the gimbal angle vector. The optimization problem for the constrained singularity-robust inverse equation is written as $$\min_{\dot{\delta}} \frac{1}{2}\left[(\mu - A\dot{\delta})^T P(\mu - A\dot{\delta}) + \dot{\delta}^T Q\dot{\delta}\right]$$

subject to $C\dot{\delta}=\gamma$, where P and Q are positive definite diagonal matrices and $\gamma$ is a desired rate of change of determinant D of Jacobian matrix A. The value of $\gamma$ determines how fast the transient of singular states occurs. The closed-form solution of the optimization problem is given by $$\begin{bmatrix} \dot{\delta} \\ \lambda \end{bmatrix} = \begin{bmatrix} A^T PA + Q & C^T \\ C & 0 \end{bmatrix}^{-1} \begin{bmatrix} A^T P\mu \\ \gamma \end{bmatrix},$$

where $\lambda$ is a Lagrange multiplier. When there are four or more CMGs, Jacobian matrix A is not a square matrix and determinant D does not exist. In this case, method 100 would take a set of three CMGs for Jacobian matrix A to iteratively compute determinant D until it is non-zero. In one embodiment, each iteration uses a different set of three CMGs.

Penetration Singularity Avoidance Steering Law Equation

The penetration singularity avoidance steering law equation utilizes a singularity penetration using a unit-delay. In the penetration singularity avoidance steering law equation, when CMG array 20 approaches singular states, gimbal rates $\dot{\delta}$ commanded by the pseudo-inverse steering law increase as determinant D of Jacobian matrix A approaches zero. At such instances when CMG array 20 approaches a singular state with accompanying high gimbal rates, gimbal rate $\dot{\delta}$ will be held its last valid, non-singular value, $\dot{\delta}_{SW}$, by applying a unit-delay. The anomalous transient associated with the attempt to invert the singular Jacobian matrix A is ignored by rapidly passing through the singularity, instead holding the last valid, nonsingular gimbal rate $\dot{\delta}_{SW}$. The penetration singularity avoidance steering law equation becomes $\dot{\delta}=\dot{\delta}_{SW}$, where $\dot{\delta}_{SW}$ is a last computed gimbal rate before CMG array 20 approaches a singular state.

In operation 116, the gimbal rate $\dot{\delta}$ calculated in operation 112 or operation 114 is output from method 100, with processing exiting method 100. In one embodiment gimbal rate $\dot{\delta}$ is output, for example, as a gimbal rate command to CMG array 20, and the application of the torque results in an attitude correction of spacecraft 10.

Figure 2:
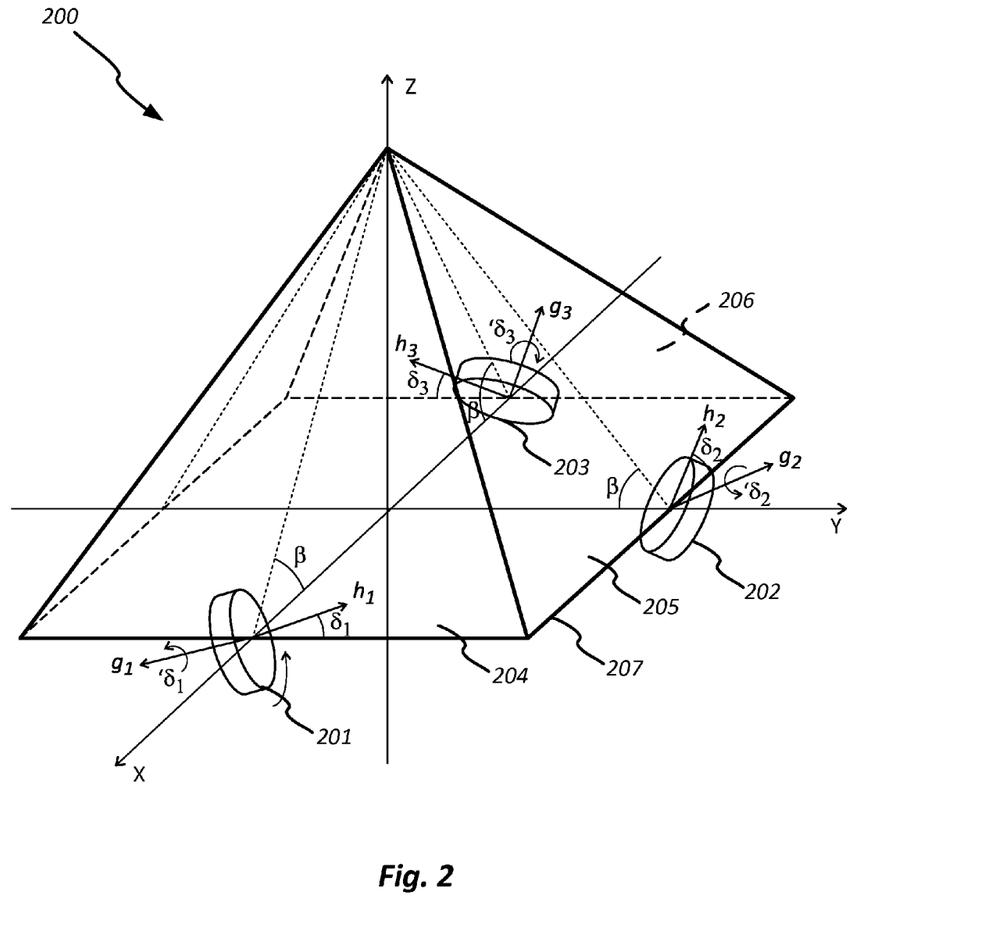
FIG. 2 illustrates a diagram of a pyramid CMG array.

FIG. 2 illustrates a diagram of a pyramid CMG array 200. In FIG. 2, the CMGs 201, 202, and 203 have axes which are orthogonal to the pyramid faces 204, 205 and 206. CMGs 201, 202 and 203 have gimbal angle values $\delta_1$, $\delta_2$ and $\delta_3$, respectively. Each of pyramid faces 204, 205, and 206 has a skew angle, $\beta$, from the horizontal surface 207. In FIG. 2, $h_i$ for i=1, 2, 3 denotes the angular momentum vector from the $i^{th}$ CMG, $g_i$ for i=1, 2, 3 denotes the unit gimbal rotation axis vector for the $i^{th}$ CMG. For CMG array 200 with $\beta=90°$ assuming the magnitude of the momentum of each CMG is equal and denoted by $h_w$, the corresponding total momentum, torque, and Jacobian matrix A becomes $$h = h_w \begin{bmatrix} -\cos\delta_2 \\ \cos\delta_1 - \cos\delta_3 \\ \sin\delta_1 + \sin\delta_2 + \sin\delta_3 \end{bmatrix},$$

$$h = h_w A\delta \text{ where } A = \begin{bmatrix} 0 & \sin\delta_2 & 0 \\ -\sin\delta_1 & 0 & \sin\delta_3 \\ \cos\delta_1 & \cos\delta_2 & \cos\delta_3 \end{bmatrix}$$

and $\dot{h}$ is the vector of rate-of-change of angular momentum of CMG array 200.

Using the direct modification singularity avoidance steering law equation, $$\dot{\delta} = U\Sigma^{\dagger*} V^H \dot{h} \text{ where } \Sigma^{\dagger*} = \begin{bmatrix} S^{\dagger*} & 0 \\ 0 & 0 \end{bmatrix}, S^{\dagger*} = \text{diag}\left(\frac{1}{\sigma_i}, \dots, \frac{1}{\eta}\right).$$

Using the constrained singularity singularity avoidance steering law equation, $$\begin{bmatrix} \dot{\delta} \\ \lambda \end{bmatrix} = \begin{bmatrix} A^T P A + Q & C^T \\ C & 0 \end{bmatrix}^{-1} \begin{bmatrix} A^T P \mu \\ \gamma \end{bmatrix}.$$

Using the penetration singularity avoidance steering law equation, $\dot{\delta}=\dot{\delta}_{SW}$.

Figure 3A:
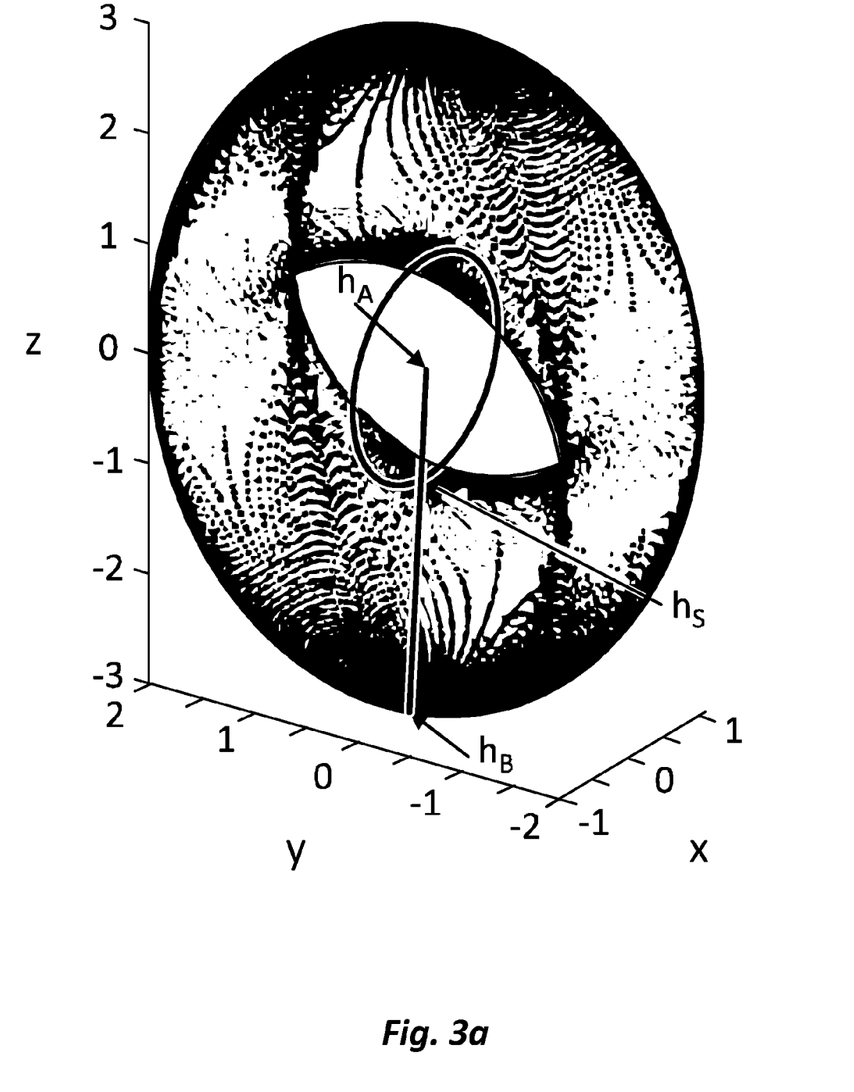
FIG. 3a illustrates a graphs of momentum trajectory results of a pyramid CMG array using a direct modification singularity avoidance steering law in accordance with one embodiment of the invention.
Figure 3B:
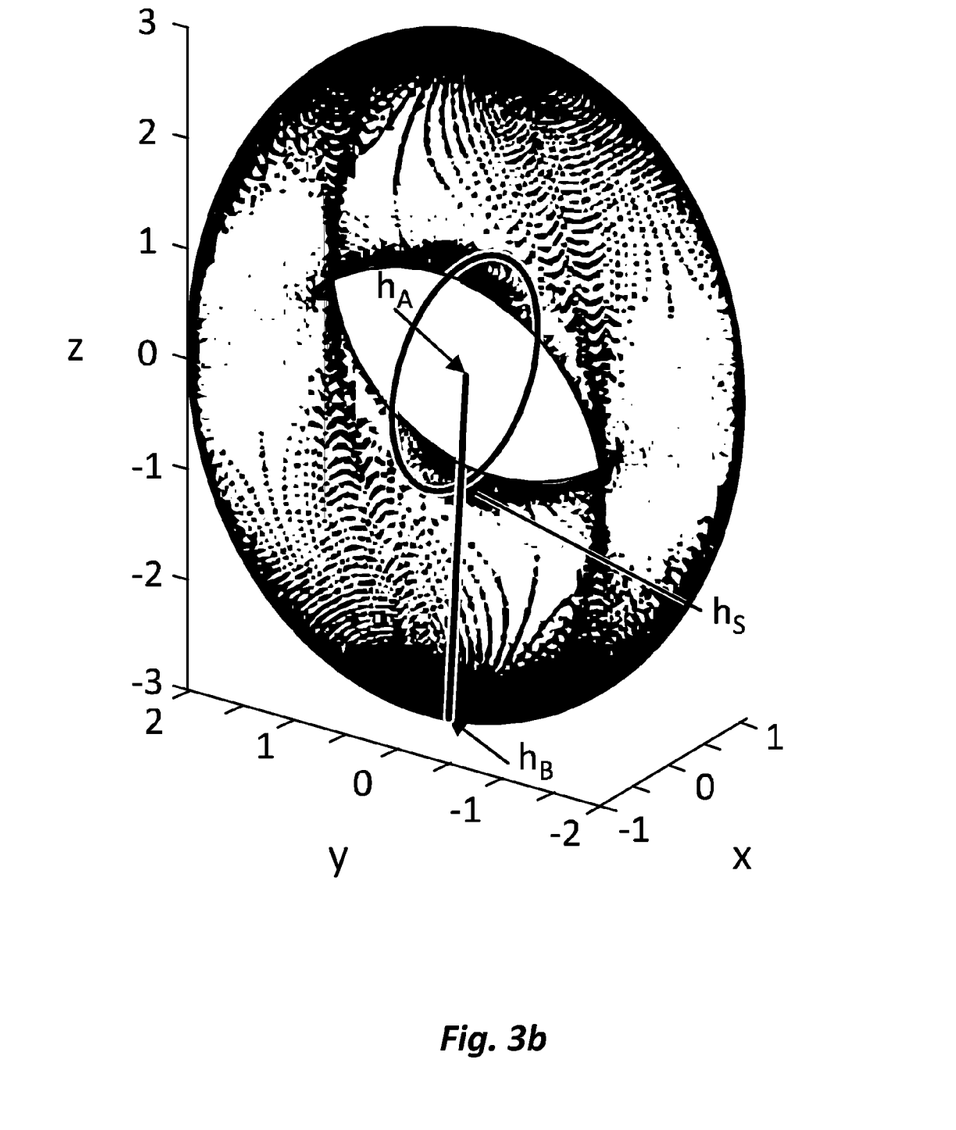
FIG. 3b illustrates a graph of momentum trajectory results of a pyramid CMG array using a constrained singularity avoidance steering law in accordance with one embodiment of the invention.
Figure 3C:
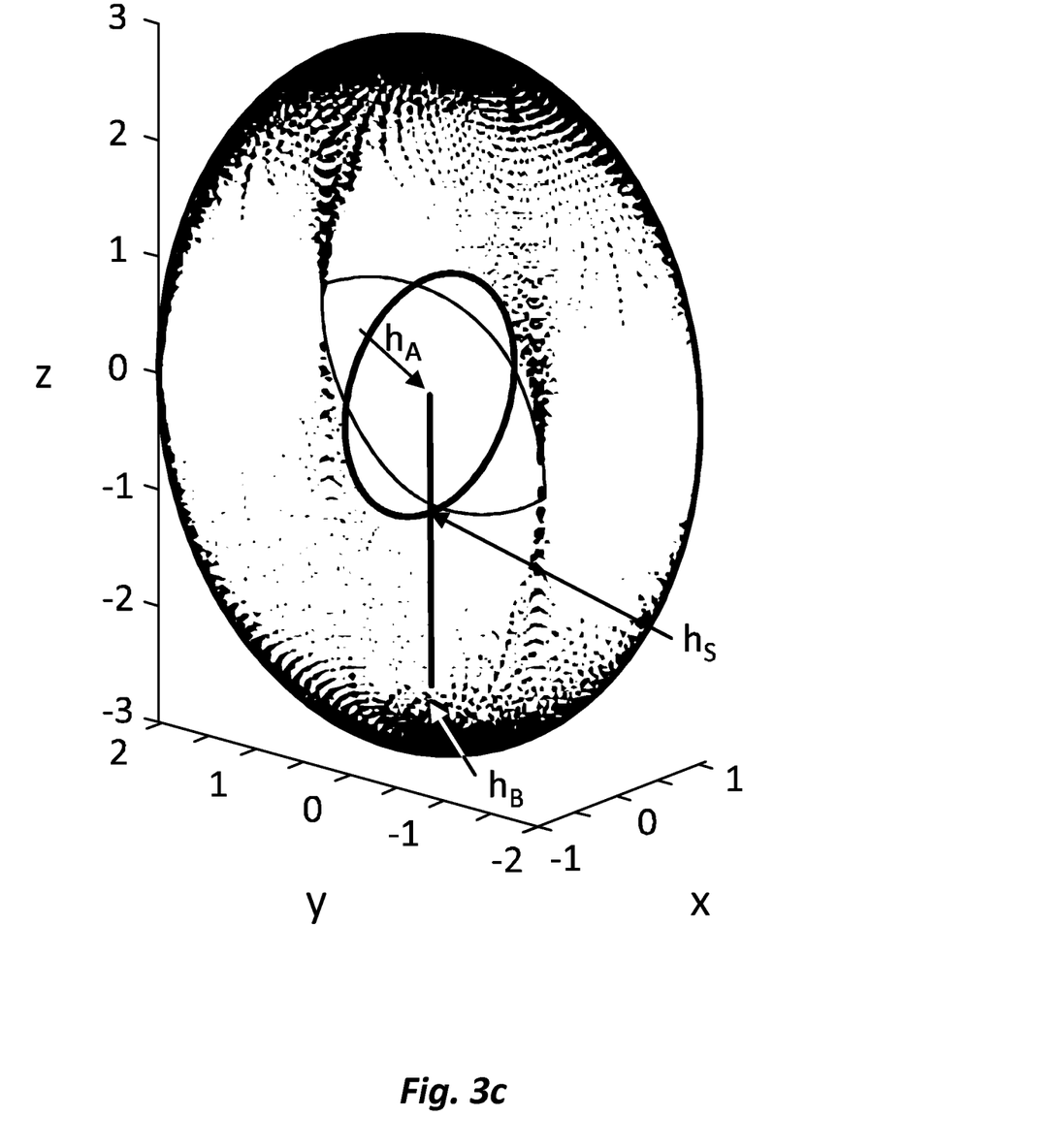
FIG. 3c illustrates a graph of momentum trajectory results of a pyramid CMG array using a penetration singularity avoidance steering law in accordance with one embodiment of the invention.

FIGS. 3a-3c illustrate graphs of momentum trajectory results of pyramid CMG array 200 using the direct modification, constrained and penetration singularity avoidance steering law equations, respectively, in accordance with embodiments of the invention. The singularity is visible in FIGS. 3a-3c, showing the angular momentum normalized by the magnitude of the angular momentum from each CMG in CMG array 200. The singularity-free volume is limited to the center area. FIGS. 3a-3c show the momentum trajectory of CMG array 200 when the spacecraft performs a z-axis rotational maneuver. The initial momentum state at $h_A$ is zero angular momentum. A positive torque command along z-axis performs the z-axis maneuver by angular momentum exchange with the CMGs of CMG array 200. As the CMGs of CMG array 200 change z-axis angular momentum, the spacecraft, e.g., spacecraft 10 (FIG. 1a), maneuvers. As the angular momentum passes a mathematical singularity, $h_s$, the standard pseudo-inverse steering law equation fails to provide the attitude control. However, attitude control is not lost, due to use of the direct modification, constrained and penetration singularity avoidance steering law equations respectively. The momentum trajectories for all three singularity avoidance steering law equations show that the momentum trajectory passes through the singularity, overcoming the mathematical singularity problem. This enables larger momentum capabilities and faster slew maneuvers of a spacecraft.

It will be understood that many additional changes in the details, materials, procedures and arrangement of parts, which have been herein described and illustrated to explain the nature of the invention, may be made by those skilled in the art within the principle and scope of the invention as expressed in the appended claims.

What is claimed is:

1. A method for avoiding gyroscopic singularities during attitude correction of a spacecraft, comprising:
   at least three gimbals within a control moment gyroscope (CMG) array;
   an attitude controller; and
   a computer apparatus comprising a processing component communicatively coupled to said at least three gimbals and to said attitude controller, said processing component performing a method for avoiding gyroscopic singularities during attitude correction, said method comprising:
   receiving a corrective torque vector μ from said attitude controller;
   receiving gimbal angle values δ from each of at least three gimbals within said CMG array;
   generating a Jacobian matrix A as a function of said gimbal angle values δ, said Jacobian matrix A including singular values;
   calculating a determinant D of said Jacobian matrix A;
   determining whether said determinant D is equal to zero;
   wherein when said determinant D is not equal to zero, calculating a gimbal rate $\dot{\delta}$ using a pseudo-inverse steering law equation;
   otherwise, wherein when said determinant D is equal to zero, calculating a gimbal rate $\dot{\delta}$ using a singularity avoidance steering law equation, wherein said calculating a gimbal rate $\dot{\delta}$ using a singularity avoidance steering law equation comprises:
   utilizing a direct modification of singular values, comprising:
   modifying singular values of said Jacobian matrix A by directly modifying a value of $\sigma_r$, where $\sigma_r$ is a smallest singular value; and
   outputting said gimbal rate $\dot{\delta}$ from said processing component to each of said at least three gimbals within said CMG array; and correcting the attitude of the spacecraft.

2. The method of claim 1, said method further comprising:
   generating said corrective torque vector μ based on a difference between a desired attitude and an actual attitude.

3. The method of claim 1, wherein said calculating a gimbal rate $\dot{\delta}$ using said singularity avoidance steering law equation comprises:
   utilizing a constrained singularity-robust inverse wherein a rate of change of said determinant D of said Jacobian matrix is constrained such that said determinant D quickly transients through zero.

4. The method of claim 3, wherein when said CMG array includes at least four gimbals, said method further comprising:
   iteratively generating said Jacobian matrix A until said determinant D is not zero, wherein a different set of three gimbals are selected from said at least four gimbals for each iteration.

5. The method of claim 1, wherein said calculating a gimbal rate $\dot{\delta}$ using said singularity avoidance steering law equation comprises:
   utilizing a singularity penetration using a unit-delay, wherein said utilizing a singularity penetration using said unit-delay comprises:
   holding said gimbal rate $\dot{\delta}$ to a last valid, non-singular value, $\dot{\delta}_{SW}$.

6. A computer based apparatus for avoiding gyroscopic singularities during attitude correction, comprising:
   a processing component configured to perform a method for avoiding gyroscopic singularities during attitude correction, said method comprising:
   receiving a corrective torque vector μ;
   receiving gimbal angle values δ for each of at least three gimbals within a control moment gyroscope (CMG) array;

generating a Jacobian matrix A as a function of said gimbal angle values δ, said Jacobian matrix A including singular values;

calculating a determinant D of said Jacobian matrix A;

determining whether said determinant $\underline{D}$ is equal to zero;

wherein when said determinant $\underline{D}$ is not equal to zero, calculating a gimbal rate $\dot{δ}$ using a pseudo-inverse steering law equation;

otherwise, wherein when said determinant $\underline{D}$ is equal to zero, calculating a gimbal rate $\dot{δ}$ using a singularity avoidance steering law equation, wherein said calculating a gimbal rate $\dot{δ}$ using a singularity avoidance steering law equation comprises:

utilizing a direct modification of singular values, wherein said direct modification of singular values comprises:

modifying singular values of said Jacobian matrix A by directly modifying a value of $σ_r$, where $σ_r$ is a smallest singular value; and outputting said gimbal rate $\dot{δ}$ from said processing component to each of said at least three gimbals within said CMG array; and outputting said gimbal rate $\dot{δ}$ from said processing component; and correcting the attitude of the spacecraft.

7. The computer based apparatus of claim 6, said method further comprising:

wherein said calculating a gimbal rate $\dot{δ}$ using a singularity avoidance steering law equation comprises:

utilizing a constrained singularity-robust inverse, wherein a rate of change of said determinant D of said Jacobian matrix is constrained such that said determinant D quickly transients through zero.

8. The computer based apparatus of claim 7, said method further comprising:

wherein when said CMG array includes at least four gimbals, said method further comprising:

iteratively generating said Jacobian matrix A until said determinant D is not zero, wherein a different set of three gimbals are selected from said at least four gimbals for each iteration.

9. The computer based apparatus of claim 6, said method further comprising:

wherein said calculating a gimbal rate $\dot{δ}$ using a singularity avoidance steering law equation comprises:

utilizing a singularity penetration using a unit-delay, wherein said utilizing a singularity penetration using said unit-delay comprises:

holding said gimbal rate $\dot{δ}$ to a last valid, non-singular value, $\dot{δ}_{SW}$.

10. The computer based apparatus of claim 6, said method further comprising:

generating said corrective torque vector μ based on a difference between a desired attitude and an actual attitude.

11. A non-transitory computer program storage component, said computer program storage component having stored therein program instructions executable by a computer processing component to perform a method for avoiding gyroscopic singularities during attitude correction, said method comprising:

receiving a corrective torque vector μ;

receiving gimbal angle values δ for each of at least three gimbals within a CMG array;

generating a Jacobian matrix A as a function of said gimbal angle values δ, said Jacobian matrix A including singular values;

calculating a determinant D of said Jacobian matrix A;

determining whether said determinant $\underline{D}$ is equal to zero;

wherein when said determinant $\underline{D}$ is not equal to zero, calculating a gimbal rate $\dot{δ}$ using a pseudo-inverse steering law equation;

otherwise, wherein when said determinant $\underline{D}$ is equal to zero, calculating a gimbal rate $\dot{δ}$ using a singularity avoidance steering law equation, wherein said calculating a gimbal rate $\dot{δ}$ using a singularity avoidance steering law equation comprises:

utilizing a direct modification of singular values, wherein said direct modification of singular values comprises:

modifying singular values of said Jacobian matrix A by directly modifying a value of $σ_r$, where $σ_r$ is a smallest singular value; and outputting said gimbal rate $\dot{δ}$; and correcting the attitude of the spacecraft.

12. The non-transitory computer program storage component of claim 11, said method further comprising:

wherein said calculating a gimbal rate $\dot{δ}$ using a singularity avoidance steering law equation comprises:

utilizing a constrained singularity-robust inverse, wherein a rate of change of said determinant D of said Jacobian matrix A is constrained such that said determinant D quickly transients through zero.

13. The non-transitory computer program storage component of claim 12, wherein when said CMG array includes at least four gimbals, said method further comprising:

repeating generating said Jacobian matrix A until said determinant D is not zero, wherein a different set of three gimbals are selected from said at least four gimbals for each repetition.

14. The non-transitory computer program storage component of claim 11, said method further comprising:

wherein said calculating a gimbal rate $\dot{δ}$ using a singularity avoidance steering law equation comprises:

utilizing a singularity penetration using a unit-delay, wherein said utilizing a singularity penetration using a unit-delay comprises:

holding said gimbal rate $\dot{δ}$ to a last valid, non-singular value, $\dot{δ}_{SW}$.

15. The non-transitory computer program storage component of claim 11, said method further comprising:

generating said corrective torque vector μ based on a difference between a desired attitude and an actual attitude.

* * * * *